United States Patent [19]
Arimoto et al.

[11] Patent Number: 5,576,098
[45] Date of Patent: Nov. 19, 1996

[54] THIN FILM MAGNETIC HEAD

[75] Inventors: Yuko Arimoto; Takabumi Fumoto; Keiji Okubo; Osamu Saito; Toyoji Ataka; Hisashi Yamasaki, all of Kawasaki, Japan

[73] Assignee: Fuji Electric Co., Ltd., Kawasaki, Japan

[21] Appl. No.: 85,946

[22] Filed: Jul. 6, 1993

[30] Foreign Application Priority Data

Jul. 8, 1992 [JP] Japan ..................... 4-181115
Jan. 29, 1993 [JP] Japan ..................... 5-013131

[51] Int. Cl.$^6$ ............... G11B 5/66; B32B 5/16
[52] U.S. Cl. ............. 428/332; 428/336; 428/692; 428/694 R; 428/694 T; 428/694 TM; 428/694 TS; 428/900; 360/120; 360/125; 360/126; 360/127; 148/304; 148/311; 148/425; 420/435
[58] Field of Search ............... 428/900, 694 R, 428/694 T, 332, 694 TM, 336, 694 TS, 692; 360/126, 125, 127, 120; 148/304, 311, 425; 420/435

[56] References Cited

U.S. PATENT DOCUMENTS

| | | | |
|---|---|---|---|
| 4,025,379 | 5/1977 | Whetstone | 29/609 |
| 4,775,576 | 10/1988 | Bouchand et al. | 428/216 |
| 4,814,921 | 3/1989 | Hamakawa et al. | 360/126 |
| 4,883,711 | 11/1989 | Shiroishi et al. | 428/336 |
| 4,935,311 | 6/1990 | Nakatani et al. | 428/611 |
| 4,943,883 | 7/1990 | Sano et al. | 360/126 |
| 4,948,667 | 8/1990 | Mikami et al. | 428/336 |
| 5,018,038 | 5/1991 | Nakanishi | 360/126 |
| 5,142,426 | 8/1992 | Ke | 360/126 |
| 5,313,356 | 5/1994 | Ohkubo | 360/126 |

FOREIGN PATENT DOCUMENTS

| | | |
|---|---|---|
| 0438687 | 7/1991 | European Pat. Off. . |
| 462385A2 | 12/1991 | European Pat. Off. . |
| 0463753 | 1/1992 | European Pat. Off. . |
| 41 40 983 | 6/1992 | Germany . |
| 48-90513 | 11/1973 | Japan . |
| 51-138899 | 11/1976 | Japan . |
| 55-84019 | 6/1980 | Japan . |
| 58-192311 | 11/1983 | Japan . |
| 60-57515 | 4/1985 | Japan . |
| 64-4908 | 1/1989 | Japan . |
| 64-42011 | 2/1989 | Japan . |
| 1124108 | 5/1989 | Japan . |
| 1-124108 | 5/1989 | Japan . |
| 2-50309 | 5/1990 | Japan . |
| 2-252109 | 10/1990 | Japan . |
| 3-112105 | 5/1991 | Japan . |
| 4-214205 | 5/1992 | Japan . |
| 2252661 | 8/1992 | United Kingdom . |
| 89 05505 | 6/1989 | WIPO . |
| 90 00794 | 1/1990 | WIPO . |

OTHER PUBLICATIONS

IBM Technical Disclosure Bulletink, "Laminated Yoke Material", vol. 21, No. 11, Apr. 1979, pp. 4367–4368.

*Primary Examiner*—Leszek Kiliman
*Attorney, Agent, or Firm*—Spencer & Frank

[57] ABSTRACT

A thin film magnetic head includes an upper magnetic core film and a lower magnetic core film laminated one on another through a magnetic gap layer. The upper and lower magnetic core films are multilayer thin films, respectively, each of which is composed of a plurality of magnetic thin film layers and a plurality of non-magnetic thin film layers, alternately laminated one on another. The magnetic core films and have single domain structures, respectively, and the use of such magnetic core films realizes a thin film magnetic head having high permeability at high frequencies and improved high frequency characteristics and attains high recording density.

23 Claims, 10 Drawing Sheets

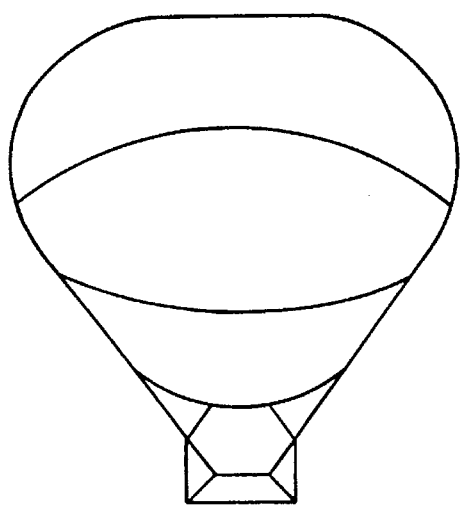
FIG.8A
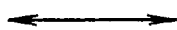
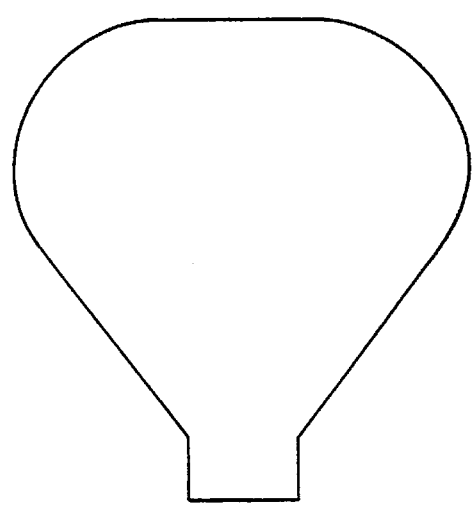
FIG.8B
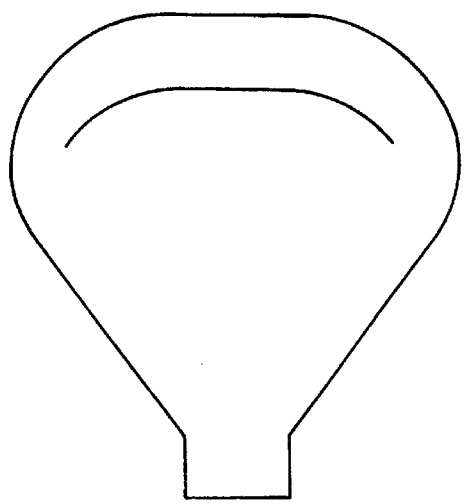
FIG.8C

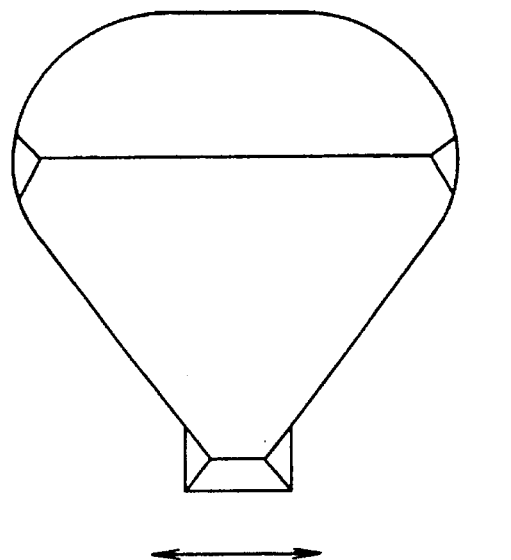
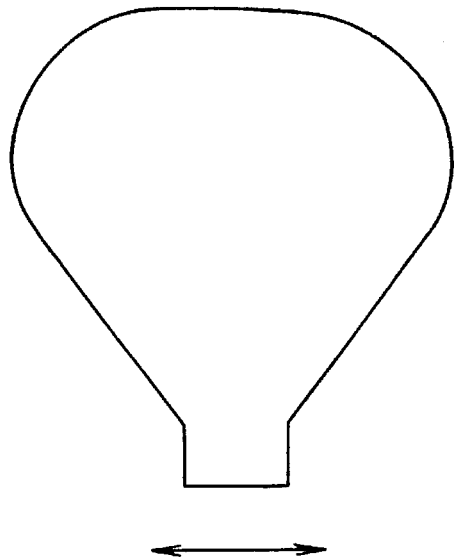
FIG.11A  FIG.11B
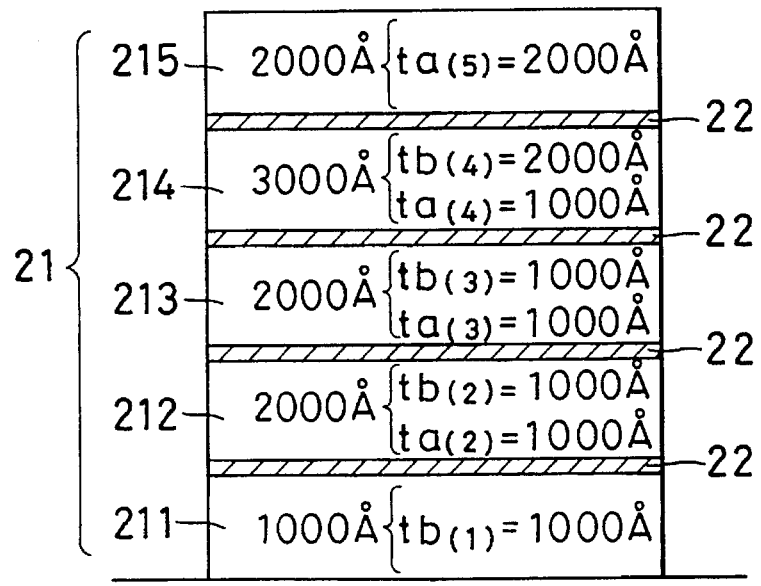
FIG.12

THIN FILM MAGNETIC HEAD

BACKGROUND OF THE INVENTION

1. Field of the Invention

The present invention relates to a thin film magnetic head for use in a magnetic disc storage apparatus, that is, a magnetic head whose magnetic circuit and coil are formed of thin films, respectively. More particularly, the present invention relates to a thin film magnetic head having a plurality of magnetic thin film layers.

Thin film magnetic heads are magnetic heads whose magnetic cores and coils are made of thin films, respectively, fabricated and integrated on respective substrates by using semiconductor fabrication technologies.

2. Description of the Prior Art

Referring to FIGS. 1 and 2, an example of the arrangement of a conventional thin film magnetic head will be explained below.

As shown in FIG. 1, a conventional thin film magnetic head has a substrate 1 made of alumina or the like, which has thereon a coil 6. The coil 6 is a spiral coil, and a magnetic core 10 composed of a pair of magnetic core films of an onion-like shape in cross section is placed around a portion of the spiral coil 6 so that the magnetic core 10 sandwiches the spiral magnetic coil 6 at a portion thereof. In a tapered top part 10a of the magnetic core 10, there is provided between the ends of the magnetic core films at one side of the head a one a read-and-write gap G having a narrow gap width g. At a base part 10b of the magnetic core, the other ends of the magnetic core films contact each other to define a magnetic circuit. In a state where the gap G is put close to or in contact with a surface of the disc, the magnetic head can as usual write data on a disc by leading electric current into the coil 6 through a pair of lead wires 9a and 9b, and the magnetic head can read data on a disc by detecting induced electric current in the coil 6.

FIG. 2 is an enlarged cross sectional view taken along line X—X in FIG. 1, showing the portion of the magnetic core provided with the read-and-write gap. As shown in FIG. 2, the magnetic core 6 is composed of a lower magnetic core film 2a and an upper magnetic core film 7a on the substrate 1. The magnetic core 6 is formed as follows. First, the lower magnetic core film 2a, which is about 1 to about 2 μm thick and which is made of a magnetic thin film such as Permalloy, is deposited on the substrate 1. Then there is deposited, on one end of the lower magnetic core film 2a, a thin gap film 3 having a thickness not exceeding 0.5 μm made of alumina or silicon oxide. On the other hand, the other ends of the upper and lower magnetic core films 2a and 7a are joined together. Around the top and base parts 10a and 10b, there are provided the coil conductors 6. In the example shown in FIG. 2, the coil 6 has two-layered turns, i.e., a lower coil part 6a and an upper coil part 6b arranged one above the other, each composed of copper or aluminum deposited by vapor deposition or sputtering and photoetched to have a spiral pattern. The lower and upper coil parts 6a and 6b are supported and covered by lower and upper insulating films 4 and 5, respectively, each made of silicon oxide or polyimide. The upper magnetic core film 7a is formed so as to sandwich the coil 6 between it and the lower magnetic core film 2a, and the lower and upper magnetic core or magnetic pole films 2a and 7a contact the gap film 3 at the top end part 10a of the magnetic core 10. The read-and-write gap G is formed by lapping the outer surface or front face of the top part 10a, and the read-and-write gap G has a narrow gap length g defined by the thickness of the gap film 3 between the lower and upper magnetic core films 2a and 7a. This type of thin film magnetic head as shown in FIGS. 1 and 2 is disclosed in, for example, Japanese Patent Application Laying-open No. 84019/1980.

In the thin head magnetic film having the above-described construction, the lower and upper magnetic core films 2a and 7a are made of high permeability soft magnetic thin films, and endowed with monoaxial anisotropy so that their axis of easy magnetization is fixed to the direction in which the head gap width g is defined.

In order to write on a magnetic medium with a thin film magnetic film at higher density, various efforts have been made to study layered structures of magnetic core films and compositions thereof.

Japanese Patent Application Laying-open No. 90513/1973 discloses a magnetic head including pole pieces each having formed thereon alternately a Permalloy thin film and an alumina thin film, the pole pieces being bonded to each other through a non-magnetic spacer, and coils wound around the pole pieces.

Japanese Patent Application Laying-open No. 38899/1976 discloses a laminate type high permeability magnetic material including a plurality of insulating thin film layers and a plurality of magnetic thin film layers formed on the insulating thin film layers and having a thickness by 0.05 to 2 times as thick as the insulating thin film, the insulating thin film and the magnetic thin film being alternately laminated. The magnetic thin film layer has a thickness of about 0.1 to 10 μm and is composed of Permalloy, Sendust or the like, and the insulating thin film layer is composed of a metal oxide such as $SiO_2$, $TiO_2$, $Al_2O_3$, $GeO_2$, $Sb_2O_4$, $NiO_2$, $CoO$, $Fe_2O_3$ or the like or organic polymers.

Japanese Patent Application Publication No. 62162/1992, corresponding to Japanese Patent Application Laying-open No. 192311/1983, discloses a laminate type magnetic material including magnetic layers and non-magnetic layers alternately laminated, in which the non-magnetic layers include two or more types which have different thicknesses. More specifically, the laminate magnetic material includes a substrate, unit film laminates formed on the substrate, each of which is composed of magnetic films each having a thickness of 0.05 to 0.2 μm and composed of Permalloy, Sendust or Fe—Si and first non-magnetic layers composed of $SiO_2$, Cu, Al, Mo or the like and having a thickness of 10 to 100 Å, alternately laminated to a thickness of 1 to 5 μm, and second non-magnetic films each having a thickness of 0.1 to 1 μm, the unit film laminates and the second non-magnetic films being alternately laminated.

Japanese Patent Application Laying-open No. 124108/1989 discloses a thin film magnetic head having a pair of magnetic core films arranged on a non-magnetic substrate in two layers one above another, in which the magnetic core films are composed of a quaternary amorphous alloy consisting essentially of cobalt as a main component and contains further containing hafnium (Hf), tantalum (Ta), and palladium (Pd), especially an alloy composed of Cr, 3.5 to 7 atomic % of Hf, 1 to 4 atomic % of Ta, and 0.2 to 6 atomic % of Pd.

Japanese Patent Application Laying-open No. 112105/1991 discloses a magnetic head including a magnetic circuit a portion of which is made of a multilayer magnetic core film composed of a laminate of an amorphous alloy layer containing Co as a main component and a non-magnetic nitride layer selected from BN, $Si_3N_4$, TaN, TiN and $W_3N$, alternately laminated one on another.

Recent development of high speed, high density computers has led to operation of thin film magnetic heads at high operation frequencies, and it has been required to develop thin film magnetic heads which can cope with high frequencies above 10 MHz as well as increases in the magnetic flux density. Thin film magnetic heads which can operate at such high frequencies must use magnetic cores having high permeabilities even at high frequencies above 10 MHz.

FIG. 3 is a diagram showing a static magnetic domain structure, in the absence of external magnetic fields, of magnetic core films 2a and 7a used in the aforementioned conventional thin film magnetic head. In FIG. 3, arrows indicate axes of easy magnetization. As will be well understood from FIG. 3, the conventional magnetic core films 2a and 7a each have a circulating magnetic domain structure, with a triangular-shaped magnetic domain 11 being formed at an end 2b, and a hexagonal magnetic domain 12 being formed above the magnetic domain 11. Since the directions of magnetization in the triangular-shaped magnetic domain 11 are parallel to the directions of magnetization from the magnetic recording medium toward the thin film magnetic head, a magnetic domain wall movement occurs at high frequencies. On the other hand, the directions of magnetization in the hexagonal magnetic domain 12 are perpendicular to the directions of magnetization from the magnetic recording medium toward the thin film magnetic head and, hence, there occurs rotation of domain magnetization in an applied high frequency magnetic field. In the magnetic core films 2a and 7a having such constructions, the magnetic domain wall movement in the triangular-shaped magnetic domain 11 does not follow under applied high frequency magnetic fields above several MHz while rotation of domain magnetization in the hexagonal magnetic domain follows up to high enough a frequency. As a result, in the conventional magnetic pole films 2a and 7a, permeability decreases at higher frequencies, which makes it difficult to write and read data in and from a disc. The movement of magnetic domain walls in the triangular-shaped magnetic domain is irreversible at high frequencies and hence it is difficult to perform reproduction of data on a disc in a stabilized manner.

SUMMARY OF THE INVENTION

Under the circumstances, an object of the present invention is to provide a thin film magnetic head having a stabilized magnetic domain structure which can operate at high frequencies and undergoes less decrease in permeability at high frequencies.

Another object of the present invention is to provide a fabrication method for fabricating such a thin film magnetic head.

Therefore, according one aspect, the present invention provides a thin film magnetic head having a substrate and at least two magnetic core films provided on the substrate and provided with a magnetic gap therebetween, the magnetic core films each comprising: an even number of magnetic thin film layers each having a substantially equal thickness; at least one non-magnetic thin film layer inserted between any adjacent two of the even number of magnetic thin film layers; and the magnetic thin film layers and the non-magnetic thin film layers being laminated one on another to form a multilayer thin film laminate.

Here, the magnetic thin film layer may be a Co-containing amorphous alloy consisting essentially of 3.0 to 4.0 atomic % of Hf, 4.5 to 5.5 atomic % of Ta, and 1.3 to 2.3 atomic % of Pd, and the non-magnetic thin film layer is an insulator selected from the group consisting of SiN, SiO$_2$ and Al$_2$O$_3$.

The magnetic thin film may have a thickness of from 500 to 5,000 Å, and the non-magnetic thin film layer has a thickness of from 10 to 1,000 Å.

According to another aspect, the present invention provides a thin film magnetic head having a substrate and at least two magnetic core films provided on the substrate and provided with a magnetic gap therebetween, the magnetic core films each comprising: a multilayer thin film composed of an odd number of magnetic thin film layers; a plurality of non-magnetic thin film layers inserted between any adjacent two of the odd number of magnetic thin film layers; wherein assuming that the number of the magnetic thin films included by the multilayer thin film is N, and n is an integer which ranges from 1 to (N−1)/2, the thickness of a (2n−1)-th magnetic thin film layer counted from a bottom layer in the magnetic thin film layers is $t_{(2n-1)}$, which is divided into a lower film thickness $ta_{(2n-1)}$ and an upper film the thickness $tb_{(2n-1)}$, and thickness of a (2n+1)th magnetic thin film layer is $t_{(2n+1)}$, which is divided into a lower film thickness of $ta_{(2n+1)}$ and an upper film thickness $tb_{(2n+1)}$, then the sum of the thicknesses of the even numbered even number-th) layers in the magnetic thin film layers counted from the bottom layer, the sum of the thicknesses of the odd numbered odd number-th) layers in the magnetic thin film layers counted from the bottom layer, and the thickness $t_{(2n)}$ of the 2n-th layer in the magnetic thin film layers satisfy equation (1) and equation (2) below:

$$\sum_{n=1}^{(N-1)/2} t_{(2n)} = t(1) + \sum_{n=1}^{(N-1)/2} t_{(2n+1)} \quad (1)$$

$$t_{(2n)} = tb_{(2n-1)} + ta_{(2n+1)} \quad (2)$$

with the provisos that:

when 2n−1=1, $tb_{(2n-1)} = t_{(2n-1)}$, and when 2n+1=N, $ta_{(2n+1)} = t_{(2n+1)}$ Here, the magnetic thin film layer may be a Co-containing amorphous alloy consisting essentially of 3.0 to 4.0 atomic % of Hf, 4.5 to 5.5 atomic % of Ta, and 1.3 to 2.3 atomic % of Pd, and the non-magnetic thin film layer is an insulator selected from the group consisting of SiN, SiO$_2$ and Al$_2$O$_3$.

The magnetic thin film layer may have a thickness of at least 1,000 Å.

The above and other objects, effects, features and advantages of the present invention will become more apparent from the following description of embodiments thereof taken in conjunction with the accompanying drawings.

BRIEF DESCRIPTION OF THE DRAWINGS

FIG. 8A is a diagram illustrating the magnetic domain structure of the multilayer thin film magnetic core film used in the thin film magnetic head shown in FIG. 4, showing a circulating magnetic domain structure;

FIG. 8B is a diagram illustrating the magnetic domain structure of the multilayer thin film magnetic core film used in the thin film magnetic head shown in FIG. 4, showing a single magnetic domain structure;

FIG. 8C is a diagram illustrating the magnetic domain structure of the multilayer thin film magnetic core film used in the thin film magnetic head shown in FIG. 4, showing a circulating magnetic domain structure appearing at an end portion;

FIG. 11A is a diagram illustrating the magnetic domain structure (circulating magnetic domain structure) of a thin film magnetic head according to a comparative example;

FIG. 11B is a diagram illustrating the magnetic domain structure (single magnetic domain structure) of a multilayer thin film used in the thin film magnetic head shown in FIG. 9;

FIG. 12 is a schematic cross sectional view showing the structure of a multilayer thin film used in the magnetic core of a thin film magnetic head according to a third embodiment of the present invention;

DETAILED DESCRIPTION OF PREFERRED EMBODIMENTS

In the present invention, magnetic core films of multilayer structures are used, and the number of layers and the thickness of each of the magnetic core films are set up to predetermined values so that the occurrence of magnetic domains can be prevented or controlled and thus a single domain structure can be used in the fabrication of thin film magnetic heads.

That is, according to the present invention, a thin film magnetic head includes a magnetic core which has a pair of multilayer thin films each comprised by an even number of magnetic core films each having the same film thickness, or an odd number of magnetic core films each having a predetermined value depending on the film thicknesses of two adjacent layers directly overlying and underlying, respectively, the layer in question. The use of such a construction enables a magnetic core having a single domain structure to be obtained.

Hereinafter, the present invention will be described in more detail by embodiments with reference to the accompanying drawings. However, the present invention should not be construed as being limited thereto.

EMBODIMENTS

Embodiment 1

Figure 1:
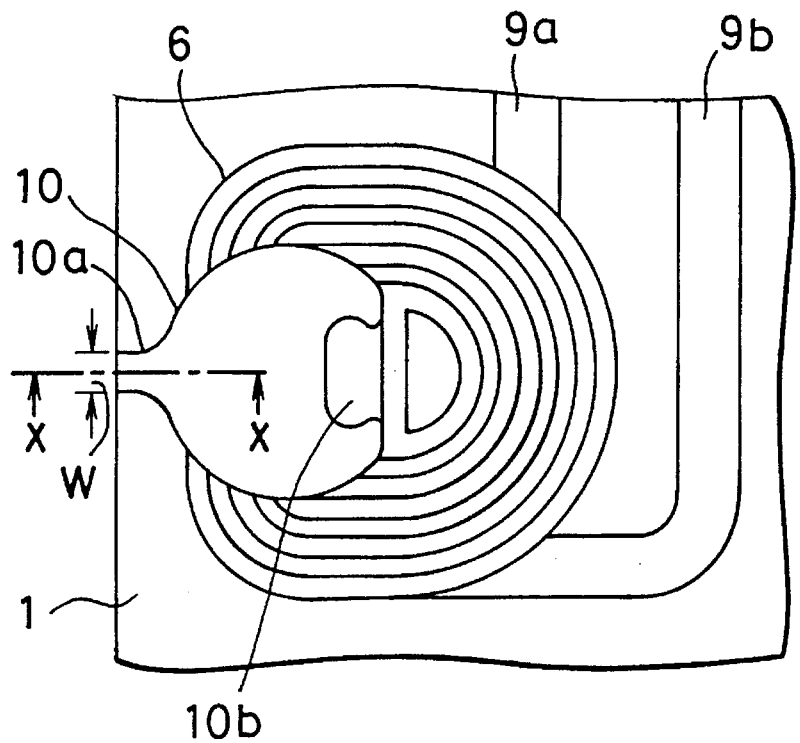
FIG. 1 is a plan view showing the general arrangement of a conventional thin film magnetic head.
Figure 2:
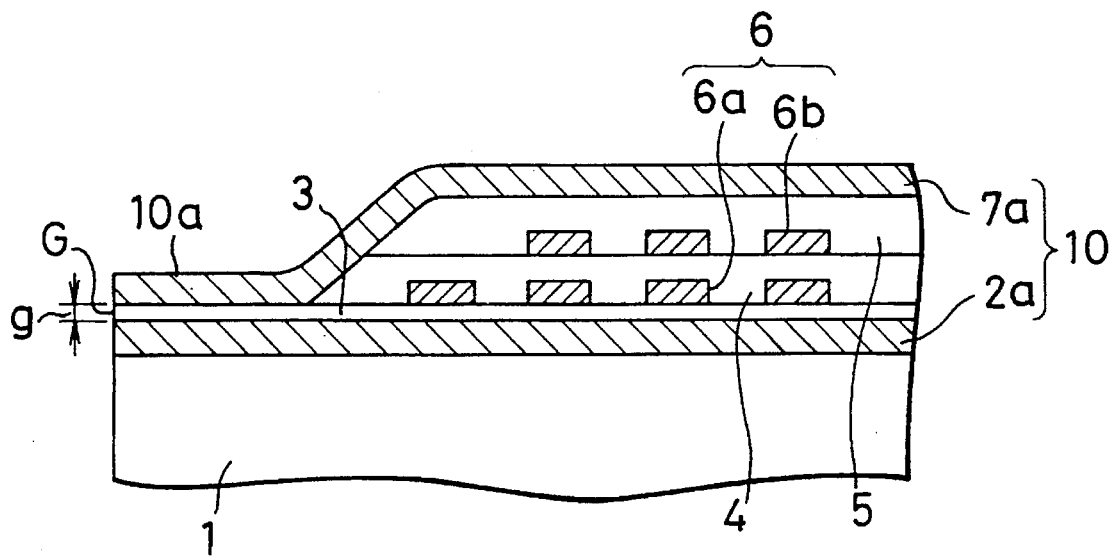
FIG. 2 is a cross sectional view taken along line X—X in FIG. 1, showing a portion of the conventional thin film magnetic head.
Figure 3:
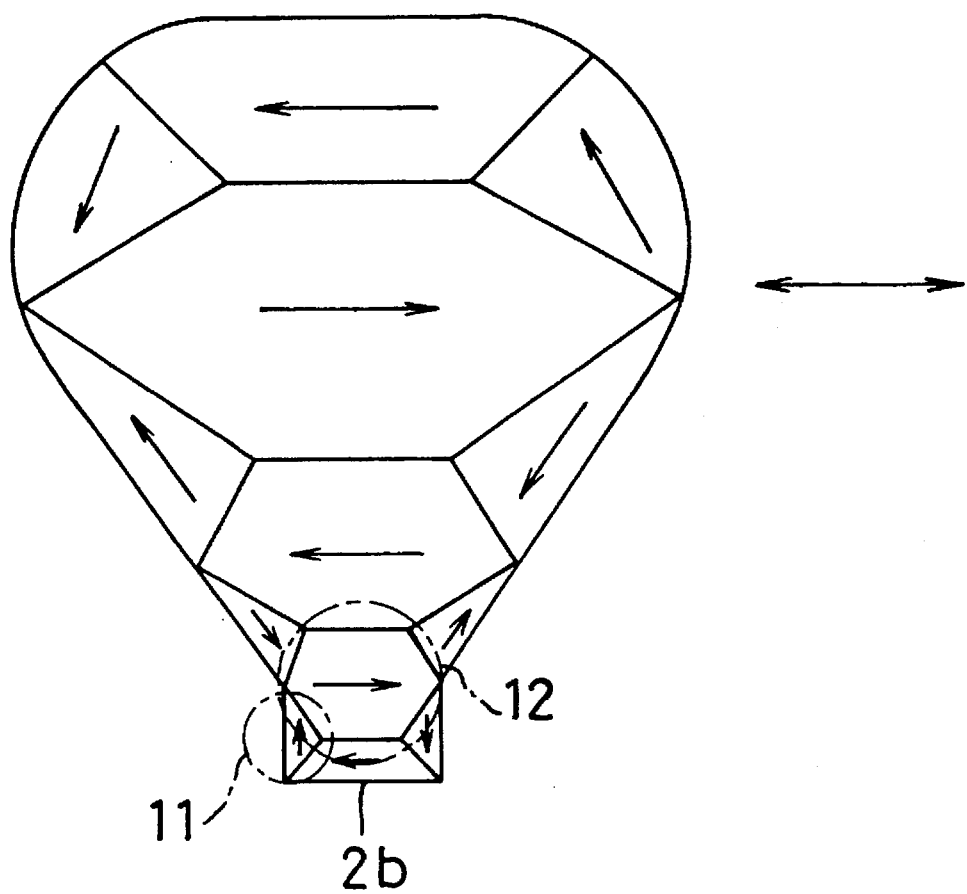
FIG. 3 is a diagram showing the magnetic domain structure of a conventional core film in the conventional thin film magnetic head shown in FIGS. 1 and 2.
Figure 4A:
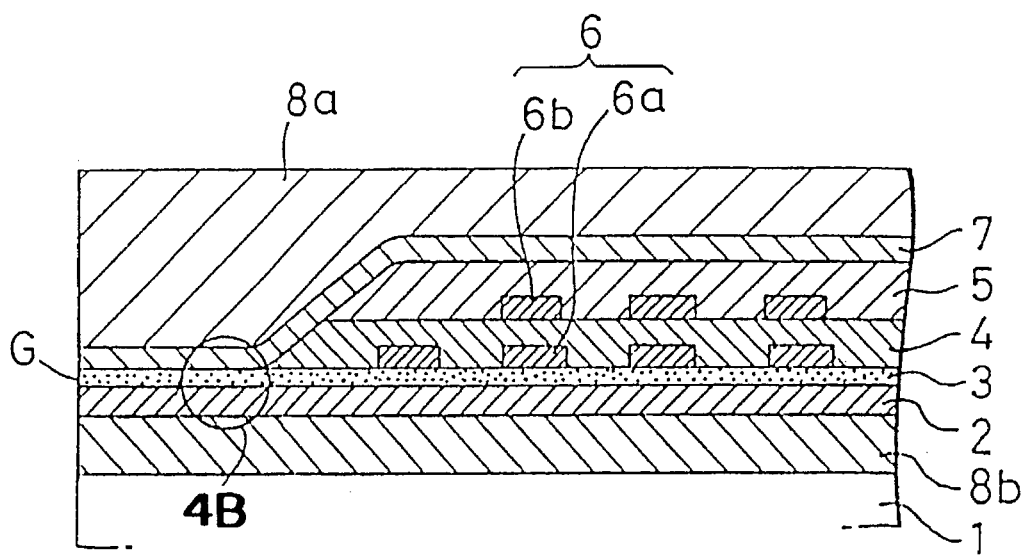
FIG. 4A is a cross sectional view showing the arrangement of a thin film magnetic head according to a first embodiment of the present invention.
Figure 4B:
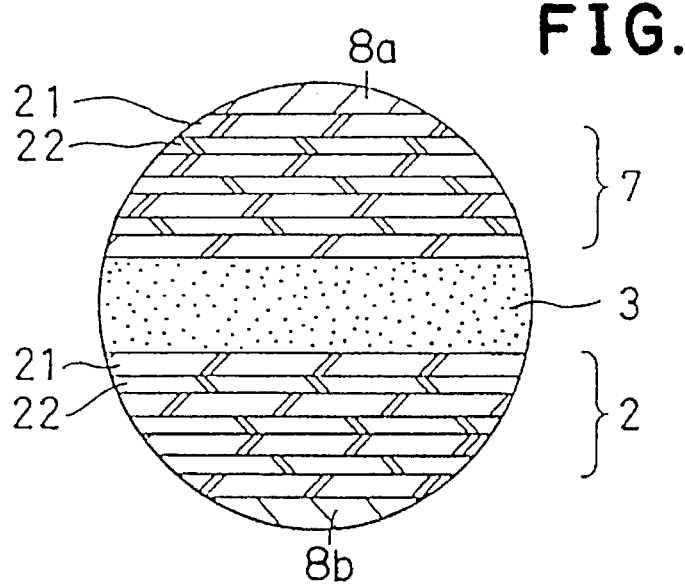
FIG. 4B is an enlarged view of the region marked 4B in FIG. 4A.

FIG. 4 is a cross sectional view showing the arrangement of a thin film magnetic head according to a first embodiment of the present invention. The thin film magnetic head according to this embodiment includes lower and upper core films which sandwich a magnetic gap therebetween, and has the same basic construction as the conventional thin film magnetic head shown in FIGS. 1 and 2 and hence the same or similar parts are designated by the same reference numerals and detailed descriptions will be omitted here.

As shown in FIG. 4, the thin film magnetic head according to the first embodiment includes substrate 1, on which a lower magnetic pole film or core film 2 is formed. An upper magnetic pole film or core film 7 is further provided on the lower magnetic core film 2 through a magnetic gap layer 3. A magnetic gap G is provided between the lower and upper magnetic core films 2 and 7 at one side of the head while at the other parts (not shown) the magnetic core films 2 and 7 are bonded to each other. A coil conductor 6 for converting magnetic signals from the magnetic core films 2 and 7 to electrical signals or vice versa is provided around the bonded portion in a plurality of turns. The coil conductor 6 consists of two coil conductor parts, i.e., a lower coil conductor part 6a and an upper coil conductor part 6b, which are supported by or embedded in lower and upper insulating layers 4 and 5, respectively. Further, upper and lower protective layers 8a and 8b are provided on the upper and lower magnetic core films 7 and 2, respectively, in order to protect the thin film magnetic head.

What is important in the present embodiment is that the lower and upper magnetic core films 2 and 7 are each composed of a plurality of magnetic thin films 21 and a plurality of non-magnetic thin films 22 alternately laminated one on another.

Figure 5:
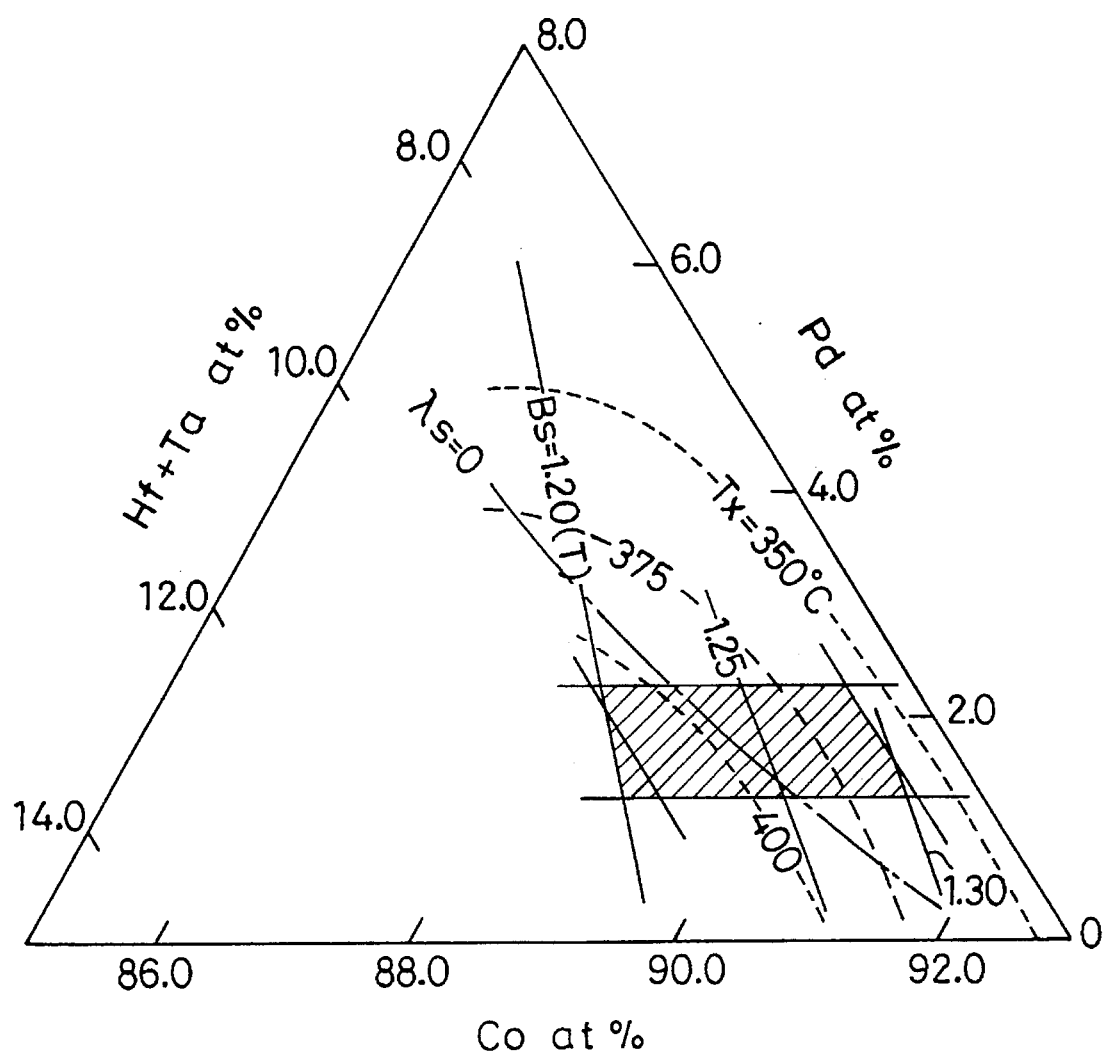
FIG. 5 is a diagram illustrating the compositions of magnetic core films used in thin film magnetic heads according to the first to third embodiments of the present invention.

First, in order to obtain high magnetic flux density, the thin film magnetic head according to the present embodiment uses a magnetic thin film which consists of a Co-containing amorphous alloy having a composition as illustrated in FIG. 5. From among the alloy compositions illustrated in FIG. 5, there are selected those alloy compositions which have magnetic flux densities not below about 1.2 tesla (T) and magnetostrictions $\lambda_s$ of near 0 at which inversion of magnetization is found by, for example, simulation to be smooth. Further selection is made for a region in which the heat resistance temperature $T_x$ is not below 350° C. since the fabrication process for fabricating thin film magnetic heads involves a step of calcination to obtain enough a sufficient heat resistance. The alloy compositions meeting these requirements are embraced by a hatched region in the diagram illustrated in FIG. 5. More particularly, a region is selected in which the quaternary composition of Co—Hf—Ta—Pd contains Hf and Ta such that the sum of Hf and Ta is from about 8 to 10 atomic %, and Pd in an amount of 1.3 to 2.3 atomic %, the balance being Co. It is confirmed that the proportions of Hf and Ta are 3.0 to 4.0 atomic % and 4.5 to 5.5 atomic %, respectively. The non-magnetic thin film 22 inserted between the magnetic thin films 21 to fabricate a multilayer thin film structure or laminate is an insulating layer which consists of an insulating material such as SiN, SiO$_2$ or Al$_2$O$_3$. The permeabilities of the magnetic thin films 21 are controlled by first endowing the magnetic thin films with magnetic anisotropy during their film formation followed by heat treatment in a rotating magnetic field to remove the anisotropy to some extent.

Figure 6:
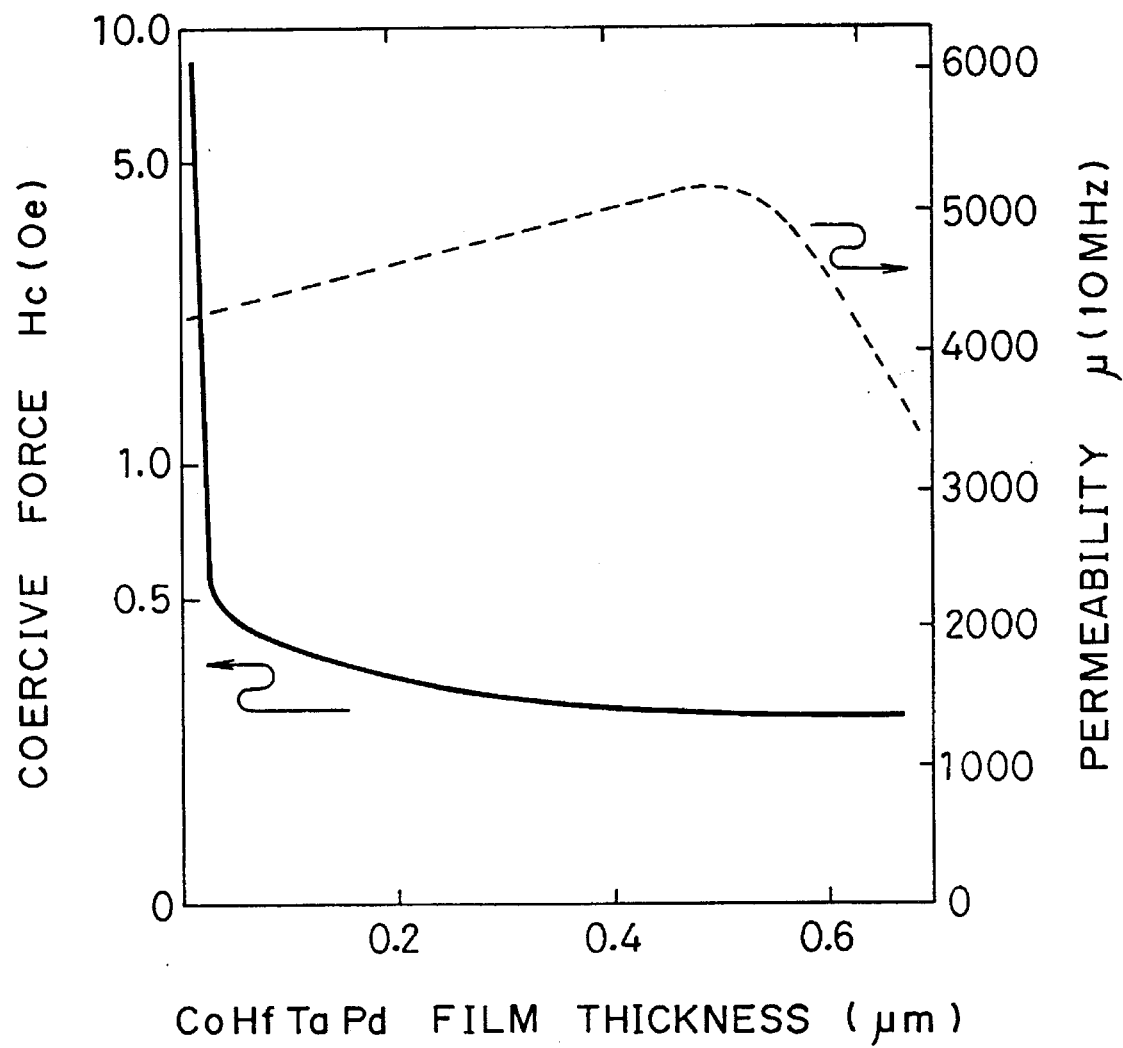
FIG. 6 is a graph illustrating the relationship of coercive force and permeability vs. film thickness of the magnetic core film used in the thin film magnetic head shown in FIG. 4.

FIG. 6 is a graph plotting coercive force Hc and permeability μ vs. film thickness (μm) of the magnetic thin film 21 having the aforementioned composition. As will be well understood from FIG. 6, a magnetic thin film 21 having a thickness of below 500 Å has an increased coercive force Hc while the magnetic thin film 21 having a thickness of above 5,000 Å has a decreased permeability μ. Therefore, the magnetic thin film used for fabricating laminates has a thickness of from 500 to 5,000 Å.

When it is made of an insulating layer consisting of SiN, SiO$_2$, Al$_2$O$_3$ or the like, the non-magnetic thin film 22 has a thickness of from 10 to 1,000 Å. This is on one hand because the use of a thickness of below 10 Å gives rise to islands and the upper and lower magnetic thin films 21 would contact each other directly from place to place, thus reducing the effects imparted by lamination, and on the other hand because it is sufficient to use a non-magnetic thin film having a thickness of several hundreds Å as an insulator in order to break exchange coupling between the magnetic thin films 21. The magnetic thin film 21 and the non-magnetic thin film 22 having the aforementioned compositions and thicknesses, respectively, are alternately laminated to form a multilayer thin film.

Figure 7:
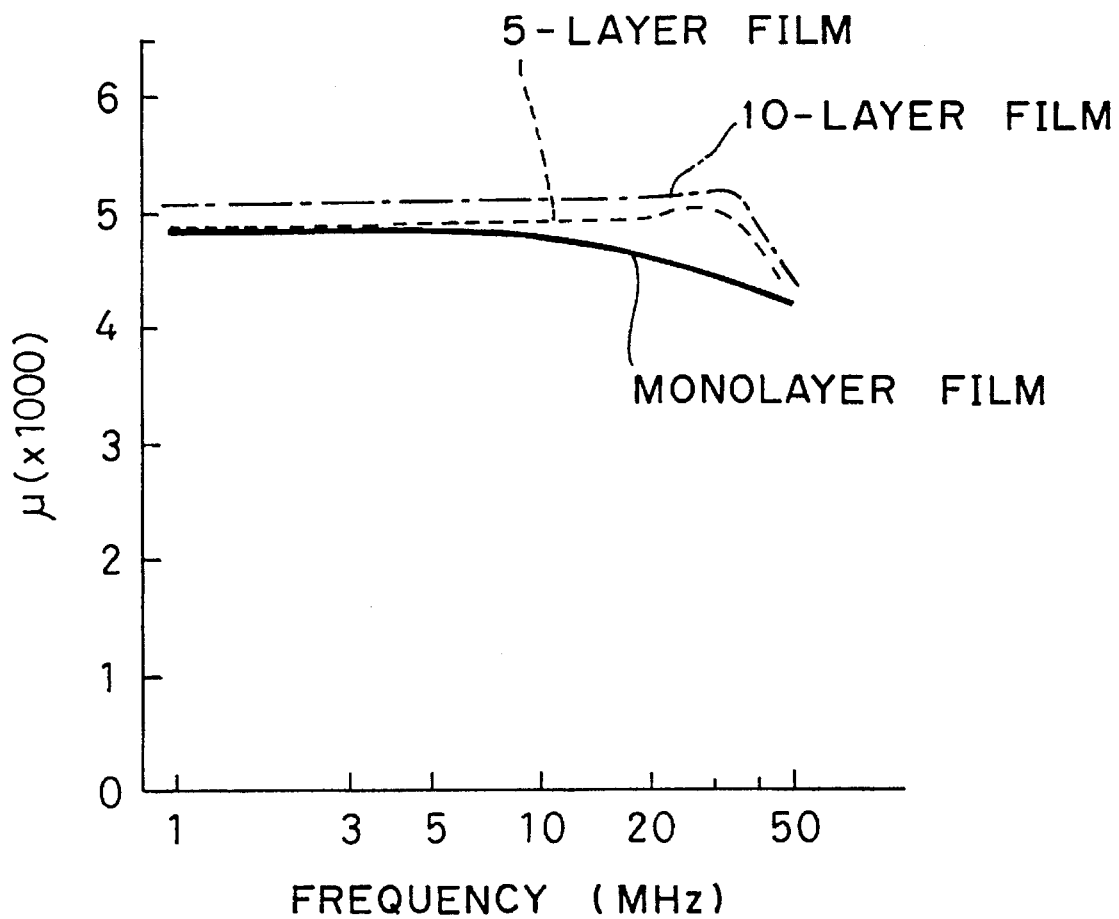
FIG. 7 is a graph illustrating the relationship of permeability vs. frequency of the multilayer thin film used in the thin film magnetic head shown in FIG. 4.

FIG. 7 is a graph illustrating the frequency characteristics or dependence of permeability of the multilayer thin film used in the thin film magnetic head and having the aforementioned composition and film thickness. A single layer of Co—Hf—Ta—Pd quaternary alloy thin film has a decreased permeability μ at frequencies not below about 5 MHz. In contrast, in the case of a multilayer thin film consisting of magnetic thin films 21 of Co—Hf—Ta—Pd and non-magnetic thin films 22 of SiN laminated one on another, the permeability μ does not decrease up to about 30 MHz. Also, it is understood that a 10-layer thin film shows a decrease in permeability smaller than that in the case of the 5-layer thin film. Thus, it reveals that the use of multilayer thin films results in improvement of the high frequency characteristics of permeability of the magnetic core.

Next, the overall thicknesses of the multilayer thin films constituting the magnetic core films 2 and 7, respectively, are set to predetermined values, and the film thickness of each layer is selected to be a fraction of the overall thickness/number of layers so that multilayer thin films can be fabricated that have a uniform thickness. Then, the probability of occurrence of magnetic domains in the magnetic core films 2 and 7 is obtained when such multilayer thin films are used as the lower and upper magnetic core films. That is, several hundreds of the lower and upper magnetic core film 2 on a 4-inch wafer were checked to see if magnetic domains appeared. The results obtained are shown in Table 1 below.

TABLE 1

| Number of Magnetic Thin Film Layers | Occurrence of Magnetic Domain Wall (%) |
| --- | --- |
| Monolayer film | 100.0 |
| 4-Layer film | 9.8 |

TABLE 1-continued

| Number of Magnetic Thin Film Layers | Occurrence of Magnetic Domain Wall (%) |
| --- | --- |
| 5-Layer film | 97.5 |
| 10-Layer film | 10.4 |

From the results shown in Table 1, it can be seen that magnetic domains appear with a probability of almost 100% when the magnetic thin film 21 is a monolayer film and when a magnetic core film is a 5-layer thin film in which the magnetic thin film 21 is laminated 5 times. Therefore, the magnetic core films each have a circulating magnetic domain structure as shown in FIG. 8A, in which an arrow indicates the direction of axis of easy magnetization. In contrast thereto, the probability of occurrence of magnetic domains in multilayer thin films having 4 and 10 magnetic thin films, respectively, is about 10%, and the magnetic thin films each have a single domain structure as illustrated in FIG. 8B, in which an arrow indicates the direction of the axis of easy magnetization. Further, it has been revealed that 4- and 10-layer multilayer thin films have one or two magnetic domain walls with a probability of about 10%. The magnetic domain wall is generated due to an edge curling effect as a result of magnetic force of the laminated magnetic thin films appearing at an end thereof without being canceled as illustrated in FIG. 8C, in which an arrow indicates the direction of easy magnetization.

These results show that the use of multilayer thin films each composed of two or more magnetic thin films 21 and non-magnetic thin films alternately laminated one on another as the magnetic core films 2 and 7 results in improvement of the high frequency characteristics of permeability of the magnetic core films. Further, lamination of an even number of the magnetic thin films 21 gives rise to magnetic core films of a single domain structure. In particular, the occurrence of single domain structures with substantially uniform film thicknesses of the magnetic thin film 21, makes it easy to control the formation of the magnetic thin film 21 upon fabrication of the magnetic core films 2 and 7 each having a single domain structure. That magnetic core films having single domain structures, respectively, can be obtained by laminating an even number of such magnetic thin films, and this may be attributable to cancellation of magnetization occurring in each of the magnetic thin films 21 by the provision of an even number of the magnetic thin films 21 so that each of the magnetic core films as a whole forms a single domain structure.

As described above, in the thin film magnetic head according to the present invention, the lamination of a multilayer, particularly an even number of layers, of magnetic thin films gives rise to a single magnetic domain structure for magnetic core films, and this construction improves the high frequency characteristics of permeability of the magnetic head. Further, a single domain structure prevents the occurrence of irreversible phenomena such as magnetic domain wall movement, with the result that stability in high frequency responses can be assured.

Embodiment 2

Next, the arrangement a thin film magnetic head according to the second embodiment of the present invention will be explained. Here, the thin film magnetic head of the present embodiment has a laminate structure composed of a lower magnetic core film 2 and an upper magnetic core film 7 laminated one on another through a magnetic gap layer 3 like the thin film magnetic head of Embodiment 1 described above with reference to FIGS. 4 and 5. above. Therefore, a description of the thin film magnetic head of the present embodiment will be also be made referring to FIGS. 4 and 5. Note that in the present embodiment, an odd number of the magnetic thin films 21 are included in each of the multilayer thin films constituting the lower and upper magnetic core films, respectively.

As shown in FIG. 4, the thin film magnetic head according to the present embodiment has laminated the lower magnetic core film 2, the magnetic gap layer 3, and the upper magnetic core film 7 in this order on the lower protective layer 8b. At one end, i.e., the tip end, of the magnetic core, there is provided a magnetic gap G filled with the magnetic gap layer 3, and the magnetic core films are connected with each other at the other end, i.e., the base end, of the magnetic core to form a connection part (not shown), around which the coil conductor 6 is wound in a plurality of turns.

Attention is drawn to the fact that in the thin film magnetic head of the present embodiment, lower and upper magnetic core films 2 and 7 are each formed of a laminate composed of a plurality of magnetic thin films 21 and non-magnetic thin films 22 alternately laminated one on another, and that the number of the magnetic thin films 21 is an odd number, and the film thicknesses of the magnetic thin 21 and the non-magnetic thin 22, respectively, are set up to meet predetermined conditions as described hereinbelow. Also, in the thin film magnetic head of the present embodiment, like the one described in Embodiment 1 above, the composition of the magnetic thin film 21 is selected from within the hatched range illustrated in FIG. 5, more particularly, a region defined by 3.0 to 4.0 atomic % of Hf, 4.5 to 5.5 atomic % of Ta, with the sum of Hf and Ta being from 8 to 10 atomic %, and 1.3 to 2.3 atomic % of Pd. The selected composition increases the magnetic flux density, facilitates inversion of magnetization, and ensures heat resistance during the fabrication process. As the non-magnetic thin film 22 used for laminating the magnetic thin film 21, SiN, $SiO_2$ or $Al_2O_3$ (insulating film) may be used. The magnetic thin film 21 is given anisotropy in advance during its film formation, and then heated in a rotating magnetic field to decrease anisotropy to control its permeability.

Figure 9:
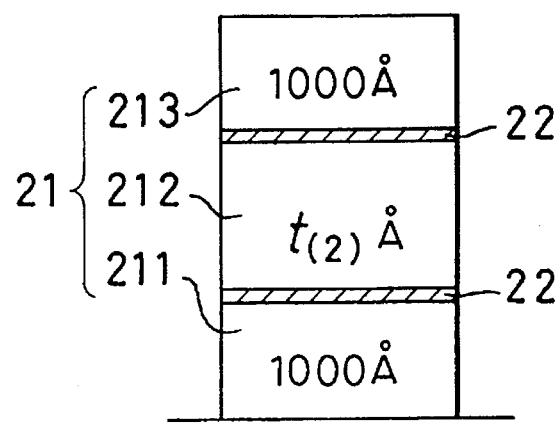
FIG. 9 is a schematic cross sectional view showing the structure of a multilayer thin film used in a thin film magnetic head according to a second embodiment of the present invention.
Figure 10:
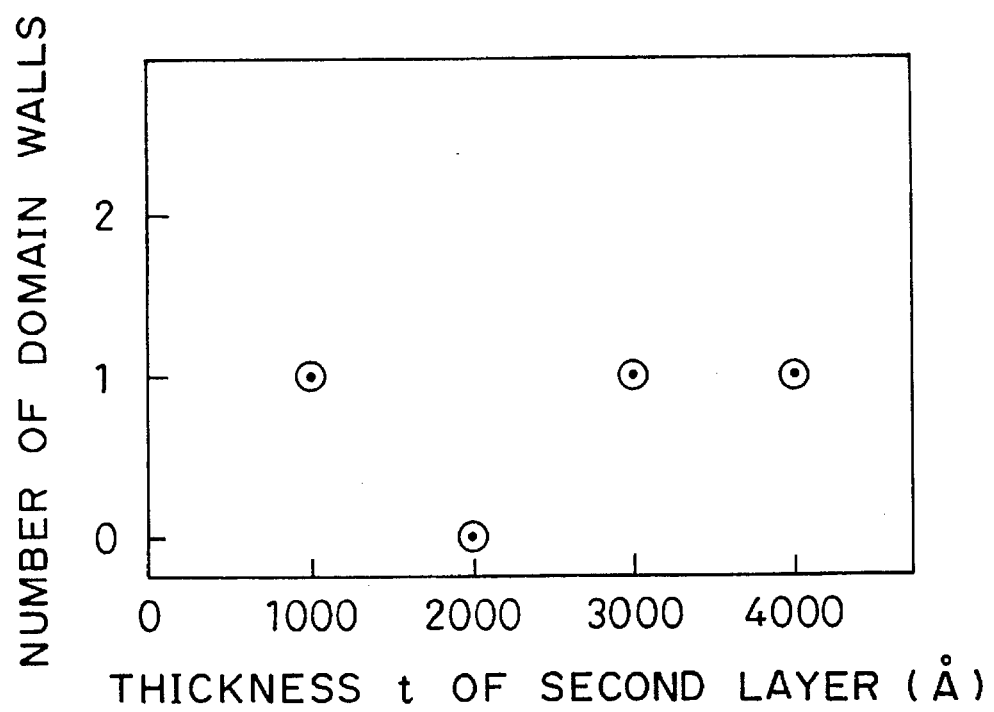
FIG. 10 is graph illustrating the relationship of the thickness of the second magnetic pole film vs. the number of magnetic domain walls appearing in the magnetic core of the multilayer thin film magnetic head shown in FIG. 9.

In the thin film magnetic head of the present embodiment, magnetic thin films 21 are formed as a three-layer laminate composed of a first magnetic thin film layer 211, a second magnetic thin film layer 212 and a third magnetic thin film layer 213 as shown in FIG. 9, which means that the number of layers is odd. Here, the first magnetic thin film layer 211 and the third magnetic thin film layer 213 are each formed to a thickness of about 1,000 Å while the thickness of the second magnetic thin film layer 212 is set up to be about 2,000 Å based on the following consideration. That is, the relationship between the film thickness of the magnetic core films and the number of magnetic domain walls appearing therein was examined when the thicknesses of the first and third magnetic thin film layers 211 and 213, respectively, was selected to be about 1,000 Å thickness of the second magnetic thin film layer 212 was varied from 1,000 Å to 4,000 Å. As a result, as shown in FIG. 10, it was confirmed that when the thickness of the second magnetic thin film layer 212 was set up to 1,000 Å, 3,000 Å, or 4,000 Å, only one magnetic domain wall is present in each of the magnetic core films 2 and 7. The magnetic domain structure is a circulating domain structure as illustrated in FIG. 11A, in which an arrow indicates the direction of the axis of easy magnetization. In contrast, when the second magnetic thin film layer 212 was formed to a thickness of 2,000 Å, the number of magnetic domain walls in each of the magnetic core films was confirmed to be 0 (null), indicating that the magnetic domain structure is a single domain structure as illustrated in FIG. 11B, in which an arrow indicates the direction of the axis of easy magnetization.

In the thin film magnetic head of the present embodiment, unlike the one described in Embodiment 1 above, the magnetic domain structure is confirmed to be a single domain structure even when the magnetic core films 2 and 7 are each made of a multilayer thin film having an odd number of the magnetic thin films 21 since the thicknesses of the first, second and third magnetic thin film layers 211, 212 and 213 meet two requirements which follow.

The first requirement is that, assuming that the number of the magnetic thin films 21 included in the multilayer thin film is N, and n is an integer which ranges from 1 to (N−1)/2, the sum of the thicknesses of the even numbered magnetic thin film layers 21 or those thin film layers that are positioned on an odd number of underlying layers counted from the lowest layer, and the sum of the thicknesses of the odd numbered magnetic thin film layers 21 or those thin film layers that are positioned at the lowest layer or on an even number of underlying layers counted from the lowest layer, are equal to each other, and should further satisfy equation (1) which follows:

$$\sum_{n=1}^{(N-1)/2} t_{(2n)} = t(1) + \sum_{n=1}^{(N-1)/2} t_{(2n+1)} \tag{1}$$

That is, the thickness $t_{(2)}$ of the second magnetic thin film layer 212 (an even numbered layer, i.e., with an odd number of layers underlying it) is 2,000 Å, which is equal to the sum of the thickness $t_{(1)}$ of the first magnetic thin film layer 211 (an odd numbered layer, i.e., with no layers underlying it) and the thickness $t_{(3)}$ of the third magnetic thin film layer 213 (odd numbered layer, i.e., with an even number of layers underlying it), the sum being 2,000 Å.

The second requirement is that, assuming that the thickness $t_{(2n-1)}$ of a (2n−1)-th magnetic thin film layer counted from the bottom is divided into a lower film portion or thickness $ta_{(2n-1)}$ and an upper film portion or thickness $tb_{(2n-1)}$, and likewise that the thickness $t_{(2n+1)}$ of a (2n+1)-th magnetic thin film layer is divided into a lower film portion or thickness $ta_{(2n+1)}$ and an upper film portion or thickness $tb_{(2n+1)}$, then the film thickness $t_{(2n)}$ of a (2n)-th magnetic thin film layer should satisfy equation (6) below:

$$t_{(2n)} = tb_{(2n-1)} + ta_{(2n+1)} \tag{2}$$

with the provisos that:
when 2n−1=1, $tb_{(2n-1)} = t_{(2n-1)}$, and
when 2n+1=N, $ta_{(2n+1)} = t_{(2n+1)}$ That is, as defined by the provisos in equation (2) above, the first magnetic thin film layer 211 corresponds to 2n−1=1, and hence, $tb_{(1)} = t_{(1)}$, and for the third thin film layer 213, which corresponds to 2n+1=N, $ta_{(3)} = t_{(3)}$, then the film thickness $t_{(2)}$ of the second thin film layer 212 $t_{(2)}$ is 2,000 Å, which is equal to the sum of the film thickness $t_{(1)}$ and the film thickness $t_{(3)}$ of the first and third magnetic thin film layers 211 and 213, respectively, the sum being also 2,000 Å. In the present embodiment, since the number of magnetic thin films 21 is three, equations (1) and (2) require substantially the same conditions.

The reason why the provision of a multilayer thin film composed of a lamination having an odd number of magnetic thin films 21 satisfying the requirements defined by the above-mentioned two equations gives rise to magnetic core films 2 and 7 each having a single domain structure is believed to be as follows: The amount of magnetization generated in each magnetic thin film 21 can be canceled by magnetic thin films directly adjacent, i.e., overlying and underlying, the magnetic thin film 21 in question, so that the magnetic core films as a whole can form a single domain structure. Therefore, the use of the magnetic core films each having a single domain structure as in the thin film magnetic head enables improvement of the high frequency characteristics of permeability, and causes no irreversible phenomena such as magnetic domain wall movement, thus ensuring high enough a response stability to high frequency waves.

Embodiment 3

Next, a thin film magnetic head according to a third embodiment of the present invention will be explained. Like the thin film magnetic head of Embodiment 2 above with reference to FIGS. 4 and 5, the thin film magnetic head of the present embodiment has a structure composed of a lower magnetic core film 2, and an upper magnetic core film 7 laminated one on another through a magnetic gap layer 3. Therefore, the description of the thin film magnetic head of the present embodiment will be also be made referring to FIGS. 4 and 5, and like numerals designate like parts or members, focusing on features specific to the thin film magnetic head according to the present embodiment.

As shown in FIG. 12, multilayer thin films are used for the lower and upper magnetic core films 2 and 7. These thin films are composed of an odd number of magnetic thin films 21 and non-magnetic thin films 22 inserted between any two adjacent magnetic thin films 21. The magnetic thin films 21 are first to fifth magnetic thin film layers 211 to 215, respectively, and the number of magnetic thin films 21 is 5 in contrast to the thin film magnetic head according to Embodiment 2 above. Here, as shown in Table 2, the first magnetic thin film layer 211 has a thickness of about 1,000 Å, the second magnetic thin film layer 212 has a thickness of about 2,000 Å, the third magnetic thin film layer 213 has a thickness of about 2,000 Å, the fourth magnetic thin film layer 214 has a thickness of about 3,000 Å, and the fifth magnetic thin film layer 215 has a thickness of about 2,000 Å.

TABLE 2

| Layer Number | Film Thickness of Each Layer (Å) | |
|---|---|---|
| | The Embodiment | Comparison |
| 1 | 1,000 { . . . , $tb_{(1)}$ = 1,000} | 3,000 |
| 2 | 2,000 { $ta_{(2)}$ = 1,000, $tb_{(2)}$ = 1,000} | 2,000 |
| 3 | 2,000 { $ta_{(3)}$ = 1,000, $tb_{(3)}$ = 1,000} | 1,000 |
| 4 | 3,000 { $ta_{(4)}$ = 1,000, $tb_{(4)}$ = 2,000} | 3,000 |
| 5 | 2,000 { $ta_{(5)}$ = 2,000, } | 1,000 |
| Sum 1* | 5,000 | 5,000 |
| Sum 2** | 5,000 | 5,000 |
| Number of Domain Walls | 0 | 1 |

Notes:
*; Sum of thicknesses of odd numbered layers.
**; Sum of thicknesses of even numbered layers, The composition of the magnetic thin film 21 is selected from within the range hatched as illustrated in FIG. 5, and more particularly, a region defined by 3.0 to 4.0 atomic % of Hf, 4.5 to 5.5 atomic % of Ta, with the sum of Hf and Ta being from 8 to 10 atomic % and 1.3 to 2.3 atomic % of Pd. SiN, SiO$_4$, or Al$_2$O$_3$ may be used as the non-magnetic thin films 22 inserted as insulating films between the magnetic thin films 21 upon lamination. The magnetic thin films 21 are given anisotropy in advance during their film formation, and then heated in a rotating magnetic field to decrease the anisotropy, thereby controlling their permeability.

As in Embodiment 2, the thickness of the magnetic thin film 21 meets two requirements for obtaining single domain structures which follow.

The first requirement is that, assuming that the number of the magnetic thin films included in the multilayer thin film is N, and n is an integer which ranges from 1 to (N−1)/2, the sum of the thicknesses of even numbered magnetic thin film layers or those thin film layers that are positioned on an odd number of underlying layers counted from the lowest layer, and the sum of the thicknesses of odd numbered layers magnetic thin films or those thin film layers that are positioned at the lowermost layer or on an even number of underlying layers counted from the lowest layer, are equal to each other, and should further satisfy equation (1) which follows:

$$\sum_{n=1}^{(N-1)/2} t_{(2n)} = t(1) + \sum_{n=1}^{(N-1)/2} t_{(2n+1)} \quad (1)$$

That is, the sum of the thicknesses $t_{(1)}$, $t_{(3)}$ and $t_{(5)}$ of the first, third and fifth magnetic thin film layers 211, 213 and 315, which are odd numbered layers, is 5,000 Å, which is equal to the sum of the thicknesses $t_{(2)}$ and $t_{(4)}$ of the second and fourth magnetic thin film layers 212 and 214, which are even numbered layers, i.e., with an odd number of layers underlying them, the sum being 5,000 Å.

The second requirement is that, assuming that the thickness $t_{(2n-1)}$ of a (2n-1)-th magnetic thin film layer counted from the bottom is divided into a lower film portion or thickness $ta_{(2n-1)}$ and an upper film portion or thickness $tb_{(2n-1)}$, and likewise that the thickness $t_{(2n+1)}$ of a (2n+1)-th magnetic thin film portion or layer is divided into a lower film thickness $ta_{(2n+1)}$ and an upper film portion or thickness $tb_{(2n+1)}$, then the film thickness $t_{(2n)}$ of a (2n)-th magnetic thin film layer should satisfy equation (2) below:

$$t_{(2n)} = tb_{(2n-1)} + ta_{(2n+1)} \quad (2)$$

with the provisos that:
when 2n−1=1, $tb_{(2n-1)} = t_{(2n-1)}$, and
when 2n+1=N, $ta_{(2n+1)} = t_{(2n+1)}$ That is, assume that as shown in Table 2 and illustrated in FIG. 12, the thickness of the second magnetic thin film layer 212 is divided into a lower film thickness $ta_{(2)}$ of 1,000 Å and an upper film thickness $tb_{(2)}$ of 1,000 Å, the thickness of the third magnetic thin film layer 213 is divided into a lower film thickness $ta_{(3)}$ of 1,000 Å and an upper film thickness $tb_{(3)}$ of 1,000 Å, and the thickness of the fourth magnetic thin film layer 214 is divided into a lower film thickness $ta_{(4)}$ of 1,000 Å and an upper film thickness $tb_{(4)}$ of 2,000 Å. However, as for the first and fifth magnetic thin film layers 211 and 215, respectively, the overall thickness of the first magnetic thin film layer 211 is set up as the upper film thickness $tb_{(1)}$ being (1,000 Å), and the overall thickness of the fifth magnetic thin film layer 215 is set up as the lower film thickness $ta_{(5)}$ being (2,000 Å). Then, the thickness $t_{(2n)}$ of a 2n-th magnetic thin film layer from the bottom is equal to the sum of the upper film thickness $tb_{(2n-1)}$ of a magnetic thin film layer which directly underlies the 2n-th layer and the lower film thickness $ta_{(2n+1)}$ of a magnetic thin film layer which directly overlies the 2n-th layer. For example, the thickness $t_{(2)}$ of the second magnetic thin film layer 212 is 2,000 Å and equals to the sum of the upper film thickness $tb_{(1)}$ of the underlying first magnetic thin film layer 211, that is, the overall thickness of the first magnetic thin film layer 211 being (1,000 Å), and the lower thickness $tb_{(3)}$ of the overlying second magnetic thin film layer 212 (1,000 Å), the sum being 2,000 Å. Here, the thickness of the third magnetic thin film layer 213 is also 2,000 Å, which is equal to the sum of the upper film thickness $tb_{(2)}$ of the underlying second magnetic thin film layer 212 (1,000 Å), and the lower film thickness $tb_{(4)}$ of the overlying fourth magnetic thin film layer 214 being (1,000 Å), the sum being 2,000 Å.

When use is made of magnetic thin films 21 whose film thickness is set up so as to meet these two requirements, the number of magnetic domain walls appearing in the magnetic core films 2 and 7 is 0 (null) as shown in Table 2 above. In contrast thereto, in the comparative example in Table 2, the sum of the thicknesses of the first, third and fifth magnetic thin film layers 211, 213 and 215, respectively, is 5,000 Å, and the sum of the thicknesses of the second and fourth magnetic thin film layers 212 and 214, respectively, is also 5,000 Å, and hence, the first requirement above is met. However, the second requirement above is not satisfied at all in whatever proportions the film thicknesses of the second and fourth magnetic thin film layers 212 and 214, respectively, are divided into corresponding upper and lower film thicknesses ta and tb, respectively. As a result, examination of the number of magnetic domain walls appearing in the magnetic core of the comparative example confirmed that one magnetic domain wall was present as shown in Table 2 above.

As described above, in the thin film magnetic head of the present embodiment, setting up the film thickness of the magnetic thin film 21 so as to satisfy equations (1) and (2) above controls the number of magnetic domain walls appearing in the magnetic pole films 2 and 7 to 0 (null), and this construction gives rise to the magnetic core films 2 and 7 each having a single domain structure. Here, the reason why the provision of a multilayer thin film composed of a lamination having an odd number of magnetic thin films 21 satisfying the requirements defined by the above-mentioned two equations gives rise to magnetic core films 2 and 7 each having a single domain structure would appear to be that amount of magnetization generated in each magnetic thin film 21 can be canceled by magnetic thin films directly adjacent, i.e., overlying and underlying, the magnetic thin film 21 in question, so that the magnetic core films as a whole can form a single domain structure. Therefore, the use of magnetic core films each having a single domain structure in the thin film magnetic head enables improvement of the high frequency characteristics of permeability, and causes no irreversible phenomena such as magnetic domain wall movement, thus ensuring high enough a response stability to high frequency waves.

Figure 13:
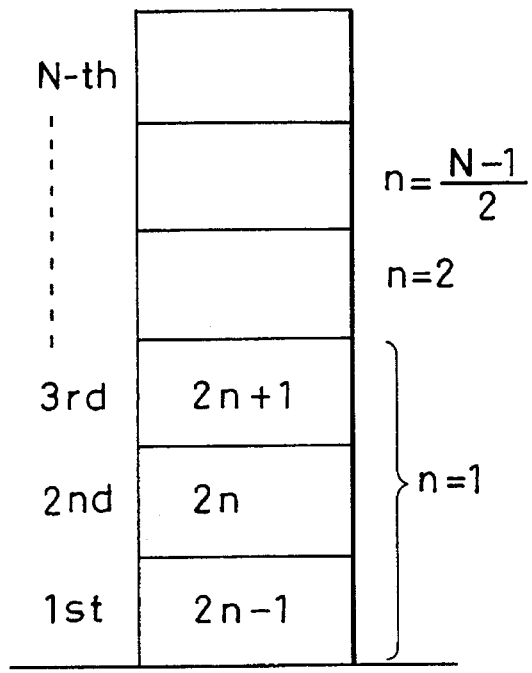
FIG. 13 is a schematic cross sectional view showing the generalized structure of a multilayer thin film used in the magnetic core of a thin film magnetic head according to the second or third embodiment of the present invention.
Figure 14:
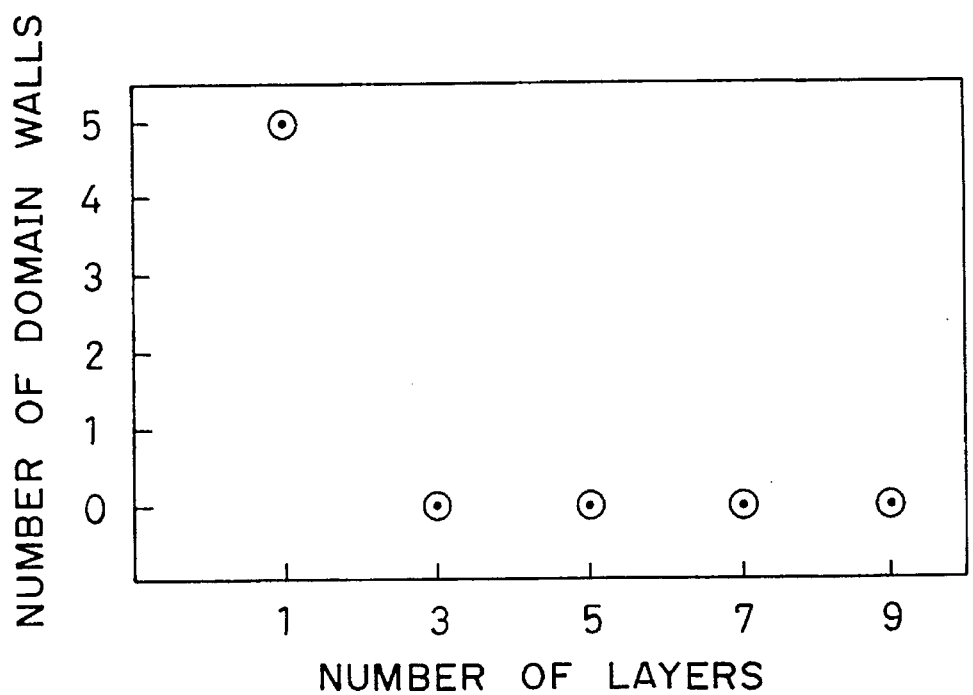
FIG. 14 is a graph illustrating the relationship of the number of magnetic core films vs. the number of magnetic domain walls appearing in a multilayer thin film used in the magnetic core of a thin film magnetic head according to the second or third embodiment of the present invention.

In the thin film magnetic head of Embodiment 2, the magnetic core films 2 and 7 each are composed of magnetic thin films 21 in three layers while the thin film magnetic head of Embodiment 3 uses magnetic thin films 21 in five layers for each of the magnetic core films 2 and 7. However, the present invention is not limited thereto, and magnetic thin films having 7-layers or more may also be used so far as an odd number of magnetic thin film layers are formed which satisfy the aforementioned first and second requirements. That is, as shown in a more or less generalized fashion in FIG. 13, magnetic thin film layers 21 were laminated to provide first through N (odd number)-th layers. The number of layers N of magnetic thin film 21 was varied, being 1, 3, 5, 7 or 9, and then the relationship between the number of layers and the number of magnetic domain walls appearing in the magnetic pole films 2 and 7 was examined. The results shown in FIG. 14 were obtained. When the number N of layers of magnetic thin film 21 was set up to 3, 5, 7 or 9, the film thickness of the magnetic thin films 21 satisfied the aforementioned two requirements expressed by equations (1) and (2). Therefore, in the case of the conventional magnetic thin film composed of only one layer, the number of magnetic domain walls in the magnetic core films is about 5 in contrast to the thin film magnetic head of the present embodiment, which has magnetic core films in which the number of magnetic domain walls is 0 (null) when the number of layers of magnetic thin film 21 is 3, 5, 7 or 9.

Further, in the thin film magnetic head of Embodiment 3, the permeability in each frequency region was measured when the lower limit of the film thickness of each magnetic thin film 21 was varied from 800 Å to 1,000 Å, 2,500 Å or 5,000 Å. The results shown in Table 3 below were obtained.

TABLE 3

| Film Thickness per Layer (Å) | Permeability at Each Frequency | | | |
| --- | --- | --- | --- | --- |
| | 5 MHz | 10 MHz | 20 MHz | 50 MHz |
| 800 | 2,800 | 2,800 | 2,500 | 1,800 |
| 1,000 | 3,600 | 3,600 | 3,300 | 2,600 |
| 2,500 | 5,000 | 5,000 | 4,900 | 4,500 |
| 5,000 | 4,900 | 4,900 | 4,600 | 4,000 |

As will be understood from Table 3, larger thicknesses of the magnetic thin film 21 tend to give higher permeability, particularly in the high frequency region. In particular, if the thickness of the magnetic thin film 21 is set up to 1,000 Å or larger, there a permeability of 3,000 or higher is obtained at a frequency on the order of about 20 MHz, and a permeability of 2,600 or higher at a frequency of 50 MHz, which satisfies the level required nowadays. Therefore, in the thin film magnetic head of the present embodiment, the magnetic core films 2 and 7 obtained each have a single domain structure, and setting up the lower limit of the film thickness of each magnetic thin film 21 gives a permeability that is high enough in the high frequency region.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A thin film magnetic head comprising:

a substrate; and a magnetic core provided on the substrate and comprising upper and lower magnetic pole films spaced apart to define a read-write gap and a coil disposed between the upper and lower magnetic pole films in an area outside of the read-write gap;

wherein the upper and lower magnetic pole films each comprise an even number of magnetic thin film layers having a soft magnetic property and having substantially equal thicknesses, and at least one non-magnetic thin film layer inserted between any adjacent two of said even number of magnetic thin film layers, said magnetic thin film layers and said at least one non-magnetic thin film layer being laminated one on another to form a multilayer thin film laminate; and wherein said magnetic thin film layers are made from a Co-containing amorphous alloy consisting essentially of 3.0 to 4.0 atomic % of Hf, 4.5 to 5.5 atomic % of Ta, and 1.3 to 2.3 atomic % of Pd, Co making up the remaining atomic %.

2. The thin film magnetic head as claimed in claim 1, wherein said at least one non-magnetic thin film layer is an insulator selected from the group consisting of SiN, $SiO_2$ and $Al_2O_3$.

3. The thin film magnetic head as claimed in claim 1, wherein each of said magnetic thin film layers has a thickness of from 500 to 5,000 Å, and said at least one non-magnetic thin film layer has a thickness of from 10 to 1,000 Å.

4. The thin film magnetic head as claimed in claim 3, wherein said at least one non-magnetic thin film layer is an insulator selected from the group consisting of SiN, $SiO_2$ and $Al_2O_3$.

5. A thin film magnetic head, comprising:

a substrate; and a magnetic core provided on said substrate and comprising upper and lower magnetic pole films spaced apart to define a read-write gap and a coil disposed between the upper and lower magnetic pole films in an area outside of the read-write gap, wherein the upper and lower magnetic pole films each comprise a multilayer thin film including an odd number of magnetic thin film layers having a soft magnetic property, and a plurality of non-magnetic thin film layers inserted between any adjacent two of said odd number of magnetic thin film layers, and wherein, when the number of said magnetic thin films included in said multilayer thin film is N, n is an integer which ranges from 1 to (N−1)/2, the thickness of a (2n−1)-th magnetic thin film layer counted from a bottom layer in the magnetic thin film layers is $t_{(2n-1)}$, which is divided into a lower film thickness $ta_{(2n-1)}$ and an upper film thickness $tb_{(2n-1)}$, and the thickness of a (2n+1)th magnetic thin film layer is $t_{(2n+1)}$, which is divided into a lower film thickness of $ta_{(2n+1)}$ and an upper film thickness of $tb_{(2n+1)}$, then the sum of the thicknesses of even numbered layers in the magnetic thin film layers counted from the bottom layer, the sum of the thicknesses of odd numbered layers in said magnetic thin film layers counted from the bottom layer, and the thickness $t_{(2n)}$ of a 2n-th layer in said magnetic thin film layers satisfy equation (1) and equation (2) below:

$$\sum_{n=1}^{(N-1)/2} t(2n) = t(1) + \sum_{n=1}^{(N-1)/2} t(2n=1) \quad (1)$$

$$t_{(2n)} = tb_{(2n-1)} = ta_{(2n+1)} \quad (2)$$

with the provisos that:
when 2n−1=1, $tb_{(2n-1)}=t_{(2n-1)}$, and
when 2n+1=N, $ta_{(2n+1)}=t_{(2n+1)}$.

6. The thin film magnetic head as claimed in claim 5, wherein said magnetic thin film layers are made from a Co-containing amorphous alloy consisting essentially of 3.0 to 4.0 atomic % of Hf, 4.5 to 5.5 atomic % of Ta, and 1.3 to 2.3 atomic % of Pd, Co making up the remaining atomic %.

7. The thin film magnetic head as claimed in claim 5, wherein each of said magnetic thin film layers has a thickness of at least 1,000 Å.

8. The thin film magnetic head as claimed in claim 6, wherein said non-magnetic thin film layers are made from an insulator selected from the group consisting of SiN, $SiO_2$ and $Al_2O_3$.

9. A thin film magnetic head, comprising:

a substrate;

a first magnetic core film provided on the substrate;

a second magnetic core film provided on the first magnetic core film, the second magnetic core film having an even number of magnetic thin film layers of substantially equal thickness and a soft magnetic property, the second magnetic core film additionally having separating means for separating adjacent magnetic thin film layers, the separating means including at least one non-magnetic thin film layer;

a non-magnetic film provided between said first and second magnetic core films, the first and second magnetic core films together with the non-magnetic film provided therebetween defining a read-write gap; and a coil having a portion which is disposed between the first and second magnetic core films in an area outside the read-write gap;

wherein said magnetic thin film layers are made from a Co-containing amorphous alloy consisting essentially of 3.0 to 4.0 atomic % of Hf, 4.5 to 5.5 atomic % of Ta, and 1.3 to 2.3 atomic % of Pd, Co making up the remaining atomic %.

10. The thin film magnetic head as claimed in claim 9, wherein the at least one non-magnetic thin film layer is an insulator selected from the group consisting of SiN, $SiO_2$ and $Al_2O_3$.

11. The thin film magnetic head as claimed in claim 9, wherein each of the magnetic thin film layers has a thickness of from 500 to 5,000 Å, and the at least one non-magnetic thin film layer has a thickness of from 10 to 1,000 Å.

12. The thin film magnetic head as claimed in claim 11, wherein the at least one non-magnetic thin film layer is an insulator selected from the group consisting of SiN, $SiO_2$ and $Al_2O_3$.

13. The thin film magnetic head as claimed in claim 9, wherein the number of magnetic thin film layers in the first magnetic core film is at least four.

14. The thin film magnetic head as claimed in claim 13, wherein the at least one non-magnetic thin film layer is an insulator selected from the group consisting of SiN, $SiO_2$ and $Al_2O_3$.

15. A thin film magnetic head, comprising:

a substrate;

a first magnetic core film provided on the substrate;

a second magnetic core film provided on the first magnetic core film, the second magnetic core film having an odd number of magnetic thin film layers having a soft magnetic property, at least one of the magnetic thin film layers being substantially thicker than at least one other of the magnetic thin film layers, and non-magnetic thin film layers which separate the magnetic thin film layers;

a non-magnetic film provided between said first and second magnetic core films, the first and second magnetic core films together with the non-magnetic film provided therebetween defining a read-write gap; and a coil having a portion which is disposed between the first and second magnetic core films in an area outside the read-write gap;

wherein said magnetic thin film layers are made from a Co-containing amorphous alloy consisting essentially of 3.0 to 4.0 atomic % of Hf, 4.5 to 5.5 atomic % of Ta, and 1.3 to 2.3 atomic % of Pd, Co making up the remaining atomic %.

16. The thin film magnetic head as claimed in claim 15, wherein the non-magnetic thin film layers are made from an insulator selected from the group consisting of SiN, $SiO_2$ and $Al_2O_3$.

17. The thin film magnetic head as claimed in claim 15, wherein each of the magnetic thin film layers has a thickness of at least 1,000 Å.

18. The thin film magnetic head as claimed in claim 15, wherein the magnetic thin film layers include a top layer and a bottom layer, both of which are thinner than the thickest magnetic thin film layer.

19. The thin film magnetic head as claimed in claim 17, wherein the non-magnetic thin film layers are made from an insulator selected from the group consisting of SiN, $SiO_2$ and $Al_2O_3$.

20. The thin film magnetic head as claimed in claim 18, wherein the number magnetic thin film layers is three, the top layer and the bottom layer each being about half as thick as the remaining layer.

21. The thin film magnetic head as claimed in claim 18, wherein the number of magnetic thin film layers is greater than three, and wherein one of the top and bottom layers is at least twice as thick as the other of the top and bottom layers.

22. The thin film magnetic head as claimed in claim 18, wherein the number of magnetic thin film layers is greater than three, wherein one of the top and bottom layers is about twice as thick as the other of the top and bottom layers, and wherein at least one magnetic thin film layer between the top and bottom layers is about three times as thick as the thinner of the top and bottom layers.

23. The thin film magnetic head as claimed in claim 18, wherein the non-magnetic thin film layer is an insulator selected from the group consisting of SiN, $SiO_2$ and $Al_2O_3$.

* * * * *